United States Patent [19]

Schott et al.

[11] 4,379,393
[45] Apr. 12, 1983

[54] LOCK FOR OPEN FRAME VEHICLES

[75] Inventors: Roger A. Schott, Redford; Lawrence A. Schott, Detroit, both of Mich.

[73] Assignee: Freedom Industries, Inc., Redford, Mich.

[21] Appl. No.: 243,997

[22] Filed: Mar. 16, 1981

[51] Int. Cl.³ .................. B62H 5/00; E05B 71/00; E05B 73/00; F16G 11/00

[52] U.S. Cl. .................. 70/234; 24/114.5; 70/233; 70/58; 280/289 L; 292/327; 403/197; 403/198

[58] Field of Search .............. 280/289 L; 403/197, 403/198, 194, 252; 70/234, 233, 226, 58; 24/115 A, 114.5, 72.7, 143 R, 201 A; 292/327

[56] References Cited

U.S. PATENT DOCUMENTS

| | | | |
|---|---|---|---|
| 255,480 | 3/1882 | Webb | 24/201 A X |
| 2,051,822 | 8/1936 | Clarke | 70/234 X |
| 2,248,328 | 7/1941 | Bechik | 24/115 A |
| 2,270,702 | 1/1942 | Getmansky | 24/143 R |
| 2,391,788 | 12/1945 | Lipton | 24/72.7 X |
| 3,101,695 | 8/1963 | Honeyman, Jr. | 70/234 X |
| 3,332,118 | 7/1967 | Temple et al. | 24/114.5 X |
| 3,800,575 | 4/1974 | Perret | 70/233 |
| 4,007,614 | 2/1977 | Schott et al. | 70/234 |
| 4,099,394 | 7/1978 | Joo | 70/233 |
| 4,302,954 | 12/1981 | Zisterer | 70/49 X |

FOREIGN PATENT DOCUMENTS

| | | | |
|---|---|---|---|
| 539919 | 12/1931 | Fed. Rep. of Germany | 70/234 |
| 726908 | 10/1942 | Fed. Rep. of Germany | 70/18 |
| 744336 | 2/1944 | Fed. Rep. of Germany | 70/233 |
| 2276210 | 1/1976 | France | 70/233 |
| 7602746 | 9/1976 | Netherlands | 70/233 |
| 60065 | 6/1912 | Switzerland | 70/49 |

Primary Examiner—Cornelius J. Husar
Assistant Examiner—Carl F. Pietruszka
Attorney, Agent, or Firm—Barnes, Kisselle, Raisch, Choate, Whittemore & Hulbert

[57] ABSTRACT

A lock device for vehicles such as bicycles and motorcycles having tubular frames which comprises a cable or chain threaded into an opening in a frame member with a stop to prevent full extraction from the frame, and a loop or other means to receive a padlock shackle to lock the vehicle to a post or to lock the wheel of a vehicle to prevent rotation.

1 Claim, 2 Drawing Figures

U.S. Patent
Apr. 12, 1983
4,379,393
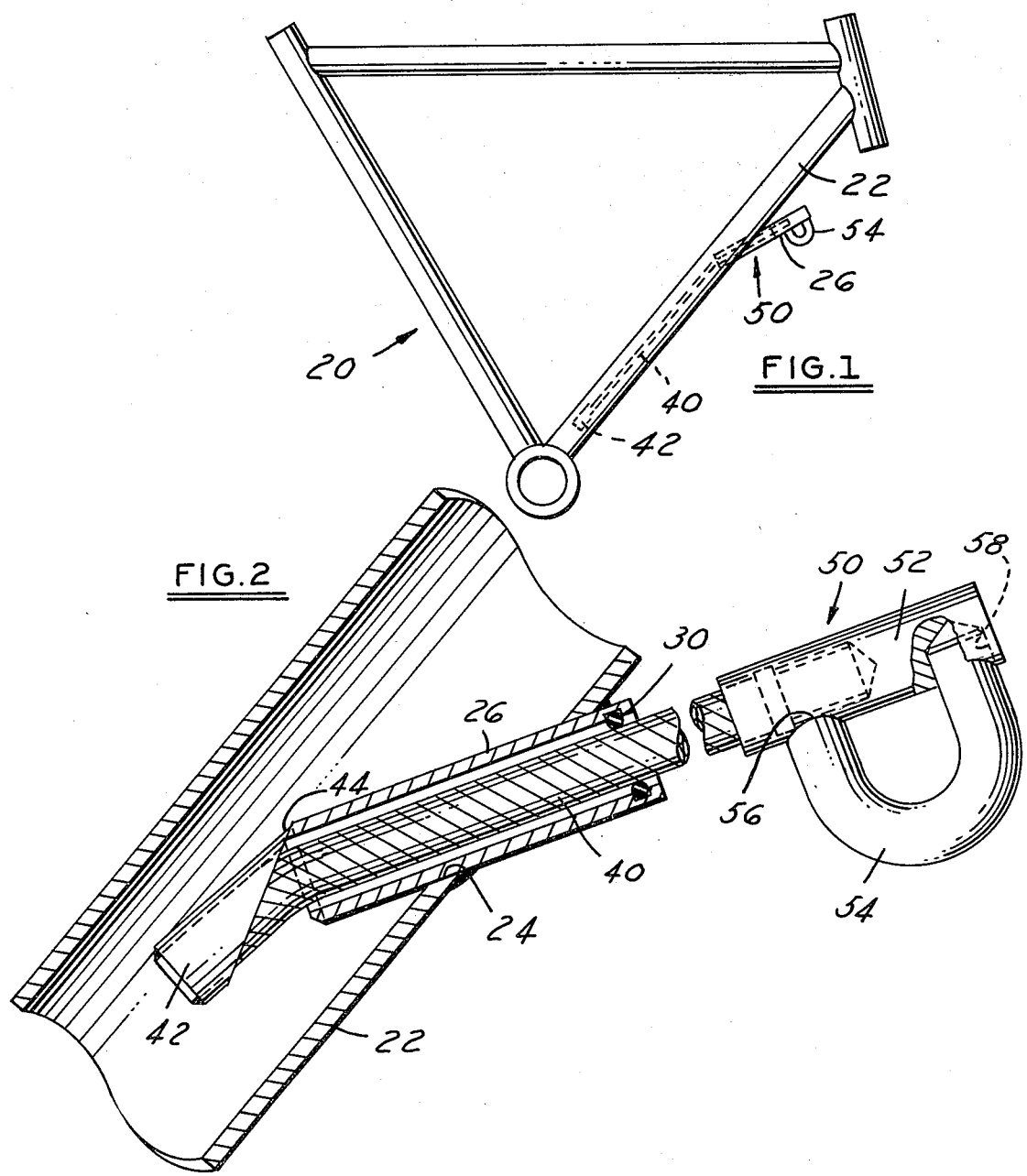

LOCK FOR OPEN FRAME VEHICLES

FIELD OF INVENTION

Cable locks for bicycles, motor cycles and like tubular frame vehicles.

BACKGROUND AND OBJECTS OF THE INVENTION

Reference is made to U.S. Pat. No. 4,007,614, issued Feb. 15, 1977, on a Lock for Vehicles and more particularly a cable lock in which the cable may be stored in a tubular section of the vehicle frame and withdrawn when used as a cable lock.

This invention constitutes an improvement on the device described in the above patent in providing a structure which can be installed readily in existing vehicles as an accessory as well as serving as an original equipment device.

It is an object of the present invention to provide a low cost effective lock device which can be used as an option when vehicles are purchased or as original equipment.

Other objects and features of the invention will be apparent in the following description and claims, in which the principles of the invention are set forth together with details relative to the use of the invention directed to persons skilled in the art.

BRIEF DESCRIPTION OF THE DRAWINGS

Drawings accompany the disclosure and the various views thereof may be briefly described as:

FIG. 1, a partial view of an open frame vehicle showing the invention in storage position.

FIG. 2, an enlarged section showing the details of construction.

DETAILED DESCRIPTION OF THE INVENTION

The cable lock device is intended to be used with open frame vehicles or devices utilizing tubular frame members, such as bicycles, tricycles and motorcycles, motor scooters, or even lawn furniture, lawn mowers, scooters and the like.

In FIG. 1, the frame 20 of a vehicle or other device has a tubular member 22. A hole 24 is drilled at an angle through the tubular member 22 and a short entrance tube 26 having an outside diameter substantially equal to the diameter of hole 24 is inserted into the hole with a portion extending inside and a portion extending outside the frame tube. The short entrance tube 26 is welded around the periphery of hole 24 to establish it firmly in place at an angle to the frame tube of about 30°.

An annular groove near the outside end of the entrance tube on the inner surface provides a recess for an O-ring 30 to serve as a water seal for a cable.

A cable 40 formed of hardened steel strands has secured on one end a stop element 42 in the form of a short angularly truncated tube with one end sliced away to provide an angled segment with a point 44 at one end. This short stop tube 42 is welded securely to the end of the cable 40. Then the cable is permanently bent so that point 44 is far enough away from cable 40 to interfere with the inner end of tube 26 to prevent removal once the device is installed. This tube has also an outer diameter slightly smaller than the inner diameter of entrance tube 26 so that the stop tube 42 can pass through the entrance tube from the outside when the cable 40 is threaded into the frame element 22.

When the cable and stop are threaded through the entrance tube 26, the stop or join tube 42 is diverted down the tube 22. The cocked position of the point 44 causes the point 44 to jam into the end of tube 26 so the cable cannot be withdrawn.

The entrance tube 26 can be installed by the manufacturer and left capped if the cable lock is not desired as an optional accessory. Or the tube can be installed by a cycle shop in existing vehicles.

At the other end of the cable 40 is a loop assembly 50 formed of a cylindrical anchor piece 52 having an end recess to receive the end of the cable. This piece can be affixed to the cable in a standard fashion by a snap ring, or welding, or other means.

A U-shaped loop piece 54 has one end nested in a surface recess 56 and the other end received and secured in a recess 58. Thus, the two pieces 52 and 54 become essentially an integral unit.

As previously indicated, the O-ring can serve as a seat against the entry of water and also as a squeegee for removing water from the cable when it is fed into the frame tube 22 after being used in inclement weather. The cable is usually vinyl coated and the squeegee effect of the O-ring will keep it dry and clean.

The spacing of the inner end of the tube from the distant wall of the frame tube makes it possible to insert the cable lock tube and cable from the outside of the unit. The shape of the lock tube 42 prevents withdrawal once the insertion is accomplished.

The cable is stored in the hollow frame member and may be withdrawn to pass around a post or a wheel rim and be fastened with a padlock or other similar device.

What is claimed as new is:

1. In a cable lock system for tubular frame vehicles such as bicycles and motorcycles and for other tubular frame devices wherein a lock cable is stored in a hollow frame tube and capable of being withdrawn to lock the vehicle to a post or similar stationary member, that improvement which comprises:
   (a) an entrance tube passing through and affixed to a wall of a hollow frame member and extending partway into said member, and
   (b) a cable of relatively stiff resilient material dimensioned to pass through said entrance tube and having an entrance end permanently bent at an angle relative to the general lineal line of said cable, a stop tube on the bent portion of the entrance end of said cable also dimensioned to pass through said entrance tube having a projecting portion extending away from the entrance end of said cable to project beyond the normal radial dimension of said cable, said cable being flexible enough to permit straightening for inserting said stop tube and said cable through said entrance tube, whereby when through said tube said cable end will assume the bent position and thrust said projecting portion of said stop tube outwardly to block reverse motion of said entrance end of said cable out of said entrance tube.

* * * * *